US006269169B1

(12) United States Patent
Funk et al.

(10) Patent No.: US 6,269,169 B1
(45) Date of Patent: Jul. 31, 2001

(54) SECURE DOCUMENT READER AND METHOD THEREFOR

(75) Inventors: Joseph E Funk, Manchester; Daryl A. White, Nashua, both of NH (US)

(73) Assignee: Imaging Automation, Inc., Bedford, NH (US)

( * ) Notice: Subject to any disclaimer, the term of this patent is extended or adjusted under 35 U.S.C. 154(b) by 0 days.

(21) Appl. No.: 09/118,597

(22) Filed: Jul. 17, 1998

(51) Int. Cl.[7] .................................................. G06K 9/00
(52) U.S. Cl. ............................ 382/100; 283/72; 356/71
(58) Field of Search ................................ 382/100, 112, 382/135, 138, 218, 190, 137, 140, 181, 191, 216, 306, 302, 312, 318, 209; 356/71; 250/556, 461.1, 330, 336.1; 399/366; 235/380; 707/500; 283/72; 252/582

(56) References Cited

U.S. PATENT DOCUMENTS 4,537,504 * 8/1985 Baltes et al. .......................... 356/71
4,634,872 * 1/1987 Janus et al. ....................... 250/458.1
4,922,109 * 5/1990 Bercovitz et al. .................. 250/556
5,045,426 * 9/1991 Maierson et al. ................... 430/126
5,295,196 * 3/1994 Raterman et al. .................. 382/135
5,321,470 * 6/1994 Hasuo et al. ........................ 399/366
5,486,686 * 1/1996 Zdybel, Jr. et al. ................ 235/375
5,640,553 * 6/1997 Schultz .................................... 707/5
5,719,948 * 2/1998 Liang .................................. 382/112
5,742,807 * 4/1998 Masinter ............................... 380/25
5,754,673 * 5/1998 Brooks et al. ....................... 382/112
5,771,315 * 6/1998 Matsuyama .......................... 382/191

* cited by examiner

*Primary Examiner*—Jayanti K. Patel
(74) *Attorney, Agent, or Firm*—Brown, Rudnick, Freed & Gesmer, P.C.

(57) ABSTRACT

Apparatus and a method are disclosed for reading documents, such as identity documents, including passports, and documents of value, to obtain and verify information recorded thereon, and to read and/or detect security information thereon to determine if such documents are counterfeit or have been altered.

23 Claims, 6 Drawing Sheets

SECURE DOCUMENT READER AND METHOD THEREFOR

SUMMARY OF THE INVENTION

This invention relates to apparatus and a method for reading documents, such as passports and documents of value, to obtain and verify information recorded thereon, and to read and/or detect security information thereon to determine if such documents are counterfeit or have been altered.

BACKGROUND OF THE INVENTION

Illegal modifications and counterfeiting of identification documents, such as passports, drivers licenses, and identification cards and badges; and documents of value, such as bonds, certificates and negotiable instruments, has been increasing year by year to the concern of companies, governments and their agencies that issue these documents. To counter this problem new materials have been and are being developed for the production of such identity documents and documents of value, that make it more and more difficult to alter or counterfeit the documents, and easier and faster to detect if such documents are counterfeit or have been altered.

These new materials utilize new laminating schemes and materials that utilize holograms, invisible inks that only appear when illuminated by certain wavelengths of visible or invisible light; retro-reflective layers inside the laminating materials; different types of inks that have one color under normal ambient light but show up as different colors when illuminated by certain wavelengths of invisible light, and many other schemes. In addition, magnetic and radio frequency (RF) taggants may be added to the laminates or base material of documents during their manufacture, and such taggants may be detected while being invisible to the eye. Further, micro-miniature smart chips may be embedded in such documents, such as they are in smart cards, and used in reading and verifying documents such as listed above.

The rise of passports, documents of value, and other security and identification documents having anti-counterfeiting, anti-alteration and verification features, and the new laminating materials, many of which are briefly described above, have created a growing need for new reader verifier equipment that can rapidly read, verify, and analyze many different types of passports, documents of value, identity and security documents made utilizing the new materials, techniques and laminating materials described above.

Such new reader verifier equipment is desperately needed at high traffic locations, such as international airports around the world, where millions of travelers pass between countries each year. However, such new equipment is also needed for many other applications such as reading and checking identity badges of employees and others in high security installations where government or industrial confidential or secret information is to be protected, and access and movements are carefully limited, controlled and recorded. In addition, such new reader verifier equipment is desperately needed to check different types of documents of value.

SUMMARY OF THE INVENTION

The above described need in the art for new document reader verifier equipment is satisfied by the present invention. Hereinafter is described new reader verifier equipment which can read and verify identity documents and documents of value. A preferred embodiment of the invention works particularly well with a new laminate material developed and marketed by Minnesota Mining and Manufacturing Company (3M), St. Paul, Minn., USA under the trade name "Confirm", and which is particularly useful in making documents such as passports. The use of this new material to laminate security or identity documents, and the use of other new materials and techniques, such as described above, make it extremely hard to alter or counterfeit documents such as passports.

The novel reader verifier equipment taught and claimed herein can quickly detect if a passport or other document is laminated with this new 3M material, or with other new materials, or if a passport or other document laminated with these new materials has been altered. An example of another 3M security laminate is taught in U.S. Pat. No. 5,658,411. Other laminates utilizes retroreflective glass microspheres such as taught in U.S. Pat. No. 5,631,064. While the remainder of this patent application refers often to passports, it should be understood that many other types of identity documents may be produced using the "Confirm" and other new laminates, the other new materials, and new techniques, and be read and verified using the novel reader verifier equipment taught and claimed herein. The verification process described herein detects illegal alterations and counterfeit productions of passports and other types of documents.

The preferred embodiment of the document reader verifier disclosed herein can read alphanumeric, different types of barcodes, and other types of information imprinted on passports and other documents in specific areas and verify the inscribed information, including against an information data base. In addition, the reader verifier can store the information read off the passport or other document in a central data base as a record of the bearer of the passport or other document passing through an airport or other location where passports or other documents must be presented when traveling.

The novel document reader verifier disclosed herein can also read photographic and other information, which may include encoded biometric information of fingerprints, voice prints, and eyeprints, recorded on a passport or other document, and then compare these to information stored in data bases or to the bearer of the passport or other document. Such biometric information can be encrypted and stored in two dimensional bar codes on identity documents. The novel document reader verifier can compare in real time such biometric information recorded on a passport or other document with the output of readers, such as fingerprint and eye readers separate from but connected to the novel reader verifier described and claimed herein, taken at the time when a passport or other document is being read and verified to authenticate that the document is being carried or presented by the person to whom it was issued. In addition, digitized photos may be printed directly on or in the base material of such identity documents, and the above mentioned biometric and other information may be invisibly embedded into bits of such digitized photos. Such invisible, embedded information may be viewed and read with lentricular arrays, and such lentricular arrays may be emulated in software.

Further, the picture on such an identity document can be automatically compared with photos in a watch list, such as generated by Interpol, using matching algorithms, to see if the bearer of such an identity document is on such a watch list and should stopped and/or questioned.

In accordance with the teaching of the present invention the novel document reader/verifier can verify that passports are valid and are made with a valid security laminate, including the 3M "Confirm" security laminate. In addition, the reader/verifier can determine if passports made with a valid security laminate or base document material have been altered, even if the alterations cannot be seen. This is done by illuminating the laminated portion of a passport or other document with certain wavelengths of light, both visible and invisible, and reading the alphanumeric information and graphical display that appears. In addition, even if valid materials are used, under other wavelengths of visible and invisible light any attempted or actual alterations clearly stand out and are easily detected either automatically by the reader verifier, or manually.

DESCRIPTION OF THE DRAWING

The invention will be better understood on reading the following Detailed Description in conjunction with the drawing in which.

DETAILED DESCRIPTION

Figure 1:
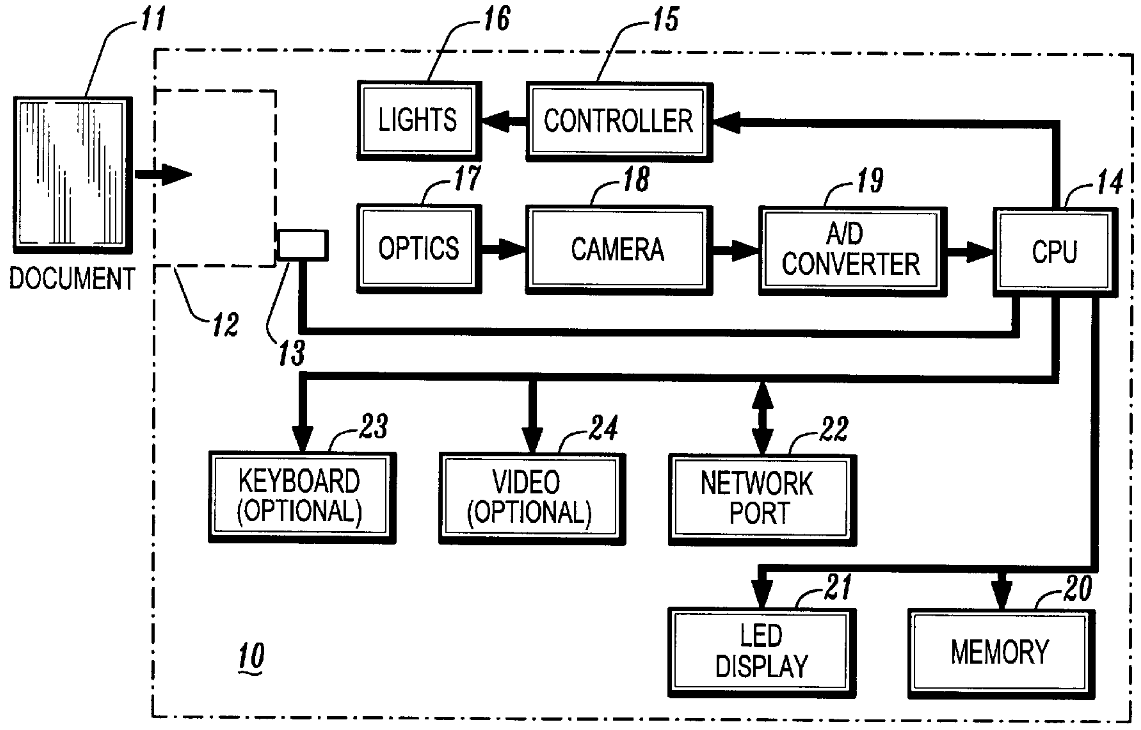
FIG. 1 shows a block diagram of the novel secure document reader verifier.

In FIG. 1 is shown a block diagram of the novel secure document reader verifier 10. Reader verifier 10 has a slot or opening 12 therein into which at least a portion of a document 11 is inserted. The size and shape of opening 12 may be changed to accommodate different types of identification documents and documents of value. An example of such a document 11 is a passport, on the inside of which is located a photograph, bibliographic and possibly other information about the bearer of the passport. This information includes passport number, issuance and expiration dates, issuing authority, biometric information about the person to whom the passport 11 is issued, and other information.

Throughout the remainder of this Detailed Description emphasis is given to reading and verifying a passport 11, but it should be remembered that many other types of documents (identity cards, drivers licenses, resident alien green cards, bank books, etc.); and documents of value, such as bonds, certificates and negotiable instruments, may be read and verified with the novel reader verifier 10. While identity documents are usually laminated, other document types, such as documents of value are usually not laminated but may implement security features which may be read and verified using the novel reader verifier disclosed and claimed herein.

A piece of thin plastic is laminated to the surface of the inside of the front cover or another page of passport 11 to seal the photograph and information recorded thereon. This is done to prevent altering the passport, but such passports are still altered despite some security measures being taken. Such security measures include affixing holographic seals, using laminating material which has invisible images therein, use of special inks, and using paper with subdued background patterns which are damaged by attempts to alter the passport.

To make it harder to alter passports, new security measures have been and are being developed to make it more difficult, if not impossible, to alter the passports. Such measures include the use of different types of inks to imprint information, and these inks show up differently under lights of different color, including invisible light such as ultraviolet and infrared. These inks may also be magnetic or have other properties that are not apparent, but which are detectable. In addition, new security laminates have been developed which have holograms therein, and other new laminates utilize retroreflective materials which display invisible security markings therein when illuminated with certain wavelengths of visible and invisible light. Further, alterations made to such security laminates, which may be invisible to the naked eye, also appear when illuminated with certain wavelengths of visible and invisible light. Still further, special paper, which may have subdued background patterns, may be used which are damaged by attempts to alter the passport, and the damage can be detected even if the damage is not visible to the unaided eye.

As the laminated page of passport 11, on which is the photograph and other information, is inserted into slot/opening 12, upon being fully inserted it actuates a switch 13, or other detection means such as a light and light sensor where a light beam is broken by the insertion of the passport 11, to start the process performed by our novel document reader verifier of reading information on the passport, verifying the recorded information, checking for alterations made to the passport, and determining if the passport is a counterfeit. The actuation of switch 13 sends a signal to central processor unit (CPU) 14 which controls the operation of the equipment and the reading and verification functions. In addition, the reader verifier 10 may function with a central computer to store basic information from verified documents, and to check if the bearer of the passport or document is on a prohibited entry or wanted list.

Figure 2:
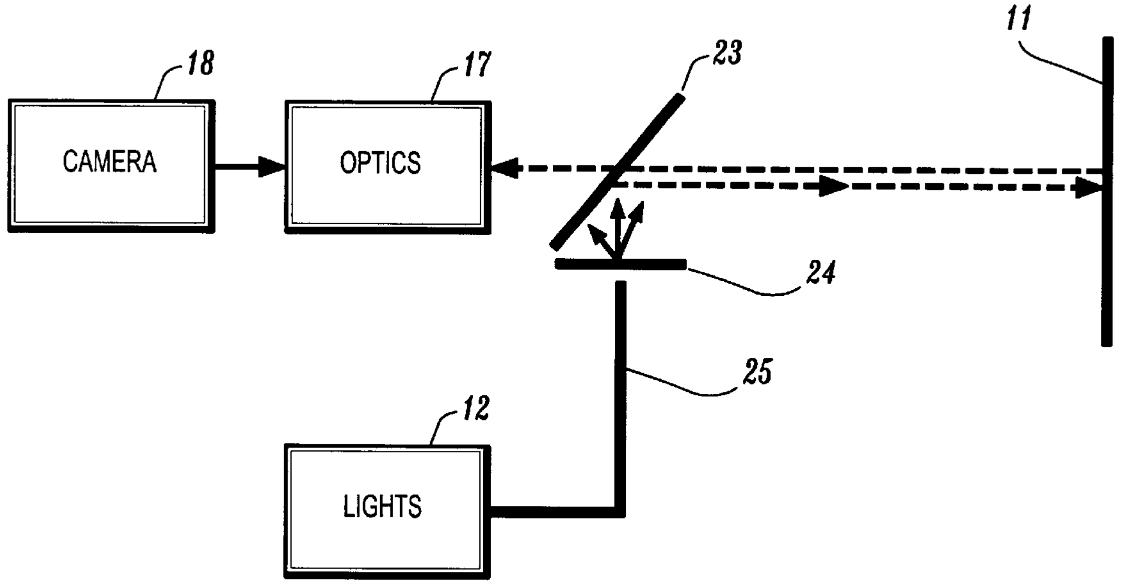
FIG. 2 shows how a document is illuminated and the reflected light is viewed with "direct" lighting in order to see certain security features on the document.

The term "direct" light sources throughout this Detailed Description refers to light sources where the light reflected from the passport travels parallel to the incident light illuminating the passport or other document. This is shown in FIG. 2. The term "indirect" light sources refers to incident light that travels a path different than the reflected light.

In operation CPU 14 sends a signal to controller 15 which sequentially energizes several light sources 16, the first of these being a fluorescent light source providing a balanced white light. This light source is used to illuminate everything on the page of the passport on which is laminated the photograph and other information. Any photograph or picture thereon is captured, as well as other types of information. However, indirect IR lighting is used to illuminate document 11 to cause the carbon based inks used to record information thereon in predetermined places, such as the MRZ area, to appear and be read using OCR software.

These sequentially energized light sources 16 include indirect far infrared (IR), long and short wave ultraviolet (UV) from arrays of light emitting diodes (LEDs), and fluorescent light sources, the light from each of which passes through a diffuser medium (not shown) to illuminate the laminated page of passport 11 with uniform lighting. These sequentially energized light sources 16 also include direct near infrared (IR) and blue light travelling through fiber optic cable from light emitting diodes to emulate a point source of light and illuminate the laminated page of the passport. Such illumination is done coaxially with the path the reflected light travels to camera 18 as described with reference to FIG. 2. Camera 18 has an operational frequency range that is able to image near and far infrared (IR—to 1000 nm), and long and short wave ultraviolet (UV).

In addition, the IR and blue light LEDs are pulsed to achieve higher peak power levels that provide greater illumination of the passport and help to expose security markings and unauthorized alterations at different levels within the passport. The frequency of pulsing the IR and blue light LEDs is high enough that the pulsing cannot be detected by camera 18.

The light from the sequentially energized multiple light sources 16 is reflected from the laminated page of passport 11 which has been inserted into slot 12 and impinges on optics 17 which focuses the image for camera 18. Optics 17 and camera 18 are part of a charge coupled device (CCD) camera that is well-known in the art. This operation is also shown in FIG. 2.

As the multiple light sources 16 are being sequentially energized, CPU 14 under control of a stored program running therein, energizes camera 18 and analog to digital (A/D) converter 19. The image output from CCD camera 18 is in the form of an analog signal which is input to A/D converter 19. Converter 19 digitizes the analog video signal output from camera 18 in a manner well-known in the art. CPU 14 takes the digitized video signal and stores it in memory 20 for processing. Memory 20 is made up of static and dynamic memory.

The process described above is repeated for each of the multiple, sequentially energized light sources that comprise lights 16.

CPU 14 next analyzes the digitized image made using the indirect IR illumination and stored in memory 20. Much information in alphanumeric text format and written using carbon based inks is often located in fixed "MRZ" fields on the laminated page of a passport or some other documents. If MRZ data is detected CPU 14 uses an optical character reading (OCR) program to "read" the alphanumeric MRZ. By analyzing information in the MRZ field, CPU 14 is able to determine if the document is a passport, or another type of document that includes an MRZ field. Such MRZ information also includes, but is not limited to, the name, birthday, sex, place of birth of the person to whom the passport is issued; the date of issuance and expiration of the passport, the issuing authority, issue run, and passport number. This information may also be encrypted and placed in bar codes on documents, and used as a double check against visible information to verify that a document is not a forgery and/or has not been altered. In addition, laser readable material may be located under the laminating material which is written and readable alike a CDROM, but is written and read in rows, and may contain data visible elsewhere on the card or encoded fingerprints, eyeprints and other biometric information.

Once CPU 14 has determined the type of document and some of other information about it, CPU 14 checks a stored library that has information about what attributes or information are stored on the document and the position of the information. CPU 14, under the control of its stored program, then looks for and reads the other information stored on the passport. These are discussed in the following paragraphs.

When the photograph of the person to whom the passport or other document is issued is one of the attributes stored on the laminated page of the passport, CPU 14 knows its location and size from the attribute library. CPU 14 isolates the portion of the first digitized video image to extract the photograph on the passport. The photograph can be displayed on an optional video display 24 of verifier reader 10. If reader verifier 10 is connected via a network port 22 to a central computer or storage network (not shown), the alphanumeric and pictorial information read from the passport or document 11 can be stored or, alternatively, the original data pertaining to a particular passport or document may be called up from storage and displayed on optional video display 24 to be manually or automatically compared with the alphanumeric and pictorial information read from the passport 11. In addition, even if the passport or other document 11 is determined not be altered or counterfeit, the identity of the bearer of the document 11 may be checked against a library of prohibited entry individuals. Other libraries of wanted persons etc. may also be assembled and checked. If the bearer of document 11 is on the prohibited entry list, this information is sent back to reader verifier 10 to be displayed on display 21 or optional video display 24 to the operation of reader 10. Display 21 is a two line alphanumeric display, but may be augmented by the use of separate LEDs.

Figure 4:
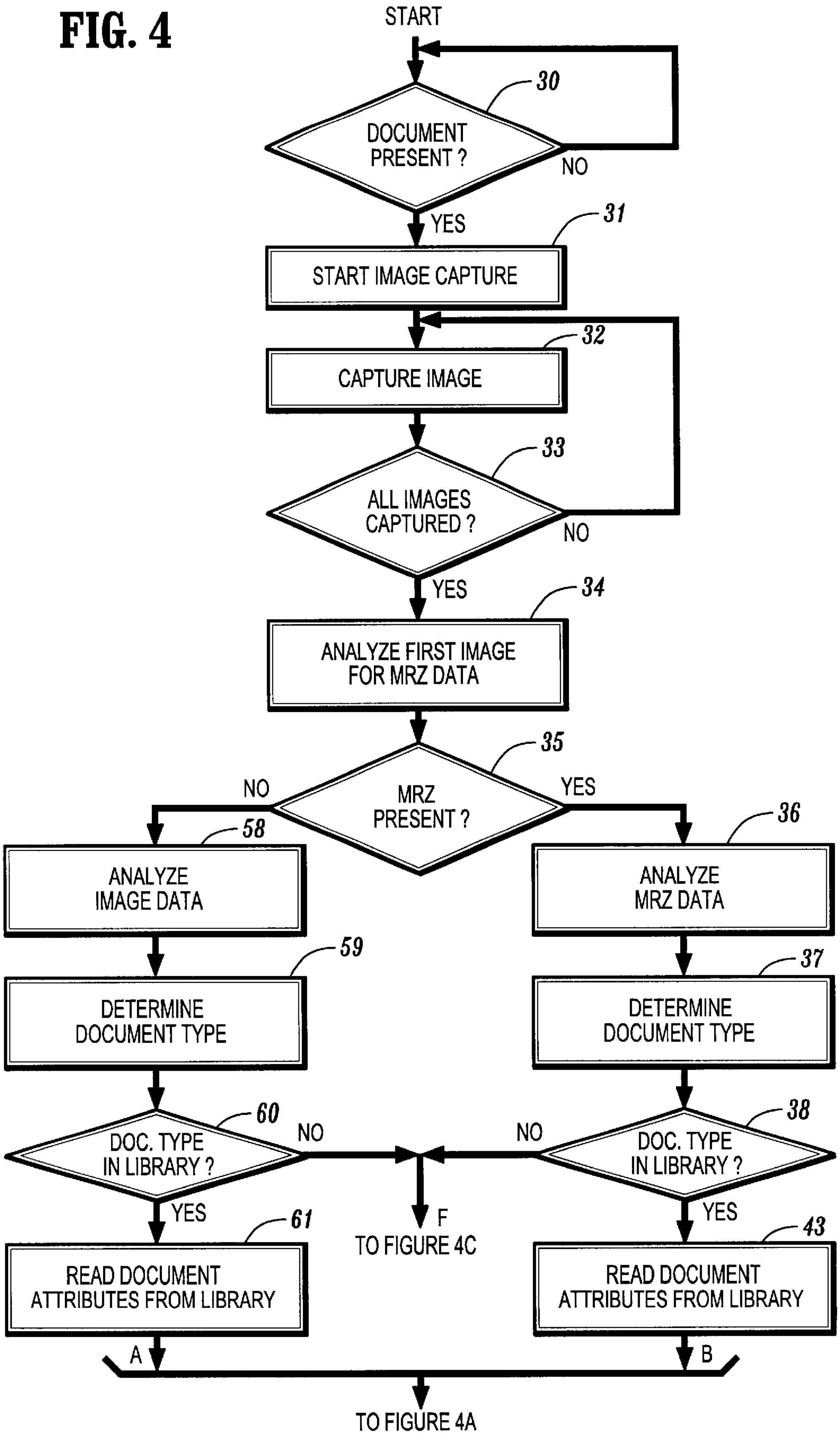
FIGS. 4, 4A, 4B and 4C are a block diagram of the operation of the reader verifier under control of a program operating in a processor therein.

Reader verifier 10 also uses the identified document type, issue date, issuing authority, etcetera to look up anti-counterfeit features in an other library for the specific type of document. CPU 14, under control of its operating program, then analyzes different ones of the stored and digitized images to determine if document 11 is counterfeit or has been altered in ways that may or may not be visible to the unaided eye. This is described further with reference to FIG. 4.

The above described reading of the alphanumeric and pictorial information on a passport is accomplished using only the balanced white light output from a fluorescent light source. CPU 14 then processes images created by reflection of the other light sources within document reader 10. As mentioned briefly above, these light sources include indirect infrared (IR—far), indirect ultraviolet (UV—long and short wave), and indirect fluorescent light sources, direct infrared (IR—near), and direct blue light. The indirect IR and UV light sources are arrays of light emitting diodes (LEDs) that emit those wavelengths of light. The direct IR and blue light sources are apply light via a fiber optic cable to emulate a point light source.

The indirect infrared (IR) light source will reflect from and make visible certain black inks made with carbon black, but will not reflect from other black inks, even though there is no difference to the unaided eye between these black inks. Printing on the passport is generally in black, but predetermined items on the passport will be printed with the special carbon black based black inks. When illuminated with the indirect IR source this latter printing will appear, while all other printing disappears. CPU 14 knows where to look in the digitized video image made under illumination of the indirect IR source for the carbon black ink printing from information stored in the attributes and anti-counterfeiting libraries. If the carbon black ink images are in the specified areas, whether they be alphanumeric text or certain patterns or images, they will be identified by CPU 14 as an indication that the passport 11 in document reader 10 has not been altered and is not counterfeit. This is not an absolute verification because other areas on the passport may be altered without touching the carbon black ink printing in the predetermined areas. Other verification tests, as described hereinafter, help to provide a more certain verification whether or not passport 11 has or has not been altered or is counterfeit.

The indirect long wave ultraviolet (UV) light source causes certain inks to fluoresce, so they appear in the image captured by camera 18 using this light source, while all other printing made with other inks disappear. The indirect short wave ultraviolet (UV) causes other, special inks to fluoresce, while all other printing disappears, including that printing made with inks that fluoresce under long wave UV. In addition, alphanumeric characters and symbols may be printed on passport 11 or other documents with inks that are not visible to the human eye, but which appear when illuminated with the UV light source. These symbols may be printed on the paper of the passport which is laminated, or may be imprinted in or on the laminating material. From the attribute and anti-counterfeiting libraries, information about the document type is read out and CPU 14 knows where to look in the digitized video image for the symbols that appear when illuminated under the UV light source. Some of these symbols may only be seen with a direct UV or IR light source and not by indirect UV or IR light sources.

Another illumination source to be energized is direct infrared (IR). The IR light source is an array of Light Emitting Diodes (LEDs) which are energized at different power levels and are pulsed on an off at different frequency rates. This IR illumination is not affected by normal scuff marks and scratches, fingerprints and dirt on the surface of the laminate. When 3M's Confirm laminate is illuminated with direct IR light the image captured is a continuous gray and any logo does not appear. It looks like a clean, gray slate. The continuous gray is easily detected as an indication of the presence of the Confirm material. Any alterations to and tampering with the Confirm laminate appear as black marks on the gray background and are easily detected. Further, at increased power levels the direct IR illumination is reflected from the bottom surface of the laminate or the surface of the passport page which is laminated in a manner that reveals the use of unauthorized laminates, and alterations to the laminate. This IR light source is incident upon and reflected from passport 11 as is described with reference to FIG. 2.

Another direct light source to be utilized is a blue light source generated by an array of blue LEDs, and is specifically used to verify that 3M's retroreflective Confirm material is used as the laminate, and has not been tampered with. Under this blue light a white logo is seen against a gray background. This is easily detected. Such logos are combinations of words and graphics that are distinctive to the country or issuer of the passport or other type of document and are compared to the information stored regarding attributes of the document type. The logo is invisible to the naked eye. Any attempts to tamper with the 3M laminate, or to use another laminate, are obvious under this direct blue light illumination. This blue light source is incident upon and reflected from passport 11 as is described with reference to FIG. 2.

Light from the many light sources described above is reflected from passport 11 and is focused by optics 17 into camera 18. Camera 18 is a Charged Coupled Device (CCD) camera that outputs an analog signal. Alternatively, a CCD camera that directly outputs a digital signal can be utilized. The analog signal output from camera 18 is input to analog to digital (A/D) converter 19 which digitizes the video signal. CPU 14 stores the digitized video signal in storage 20 and then performs processing on the images stored for each light source. The results of the image processing is displayed on display 21 to indicate to the operator of document reader 10 whether or not passport has passed the verification tests.

An optional video display 24 may be provided to display the different images output from camera 18 responsive to each of the aforementioned light sources for a manual verification of a passport.

In addition, network port 22 is used to connect document reader 10 to a central computer (not shown). Using network port 22 information read from passport 11 may be stored at the central computer, or even the time and date that the bearer of the passport is entering or leaving a country may be stored. Further, the operator of document reader 10 can use keyboard 23 to call up information stored in the central computer to further verify information and/or the picture on a passport. In addition, whether stored in reader/verifier 10 or in the central computer (not shown) the identity of the document 11 bearer can be checked against a library of prohibited entry, wanted, or other lists and appropriate action taken when the bearer is on one of these stored lists.

In FIG. 2 is shown the optics path utilized in document reader 10 for the above mentioned direct IR and blue LED illumination sources. As described above, the word direct with reference to these two light sources means that light reflected from passport 11 travels a path parallel to light incident upon passport 11 for at least a portion of the path. Positioned in front of optics 17 and camera 18 is a beam splitter 23 which reflects fifty percent and passes fifty percent of light incident upon it from a light source 12. Alternatively, a beam splitter having a different division ratio may be used, such as 70%/30% or 80%/20%. The two direct light sources are represented by the blocks marked lights 12.

Light emitted by either of the two direct LED light sources passes through a fiber-optic cable 25 and is incident upon a diffuser plate 24, which may be a diffraction grating. Plate 24 causes light output from fiber-optic cable 25 to be diffused to uniformly illuminate passport or document 11. The diffused light impinges upon beam splitter 23 which causes 50 percent of the light to pass through splitter 23 and be lost, and the other 50 percent of the light is reflected from splitter 23 and uniformly illuminates passport 11.

The light reflected from passport 11 is an image of what is on or in the passport, including its laminate. The reflected light travels back to beam splitter 23 parallel to the light rays incident upon passport 11. The reflected light impinging upon beam splitter 23 is split. Fifty percent of the light is reflected toward diffuser 24 and is lost, and fifty percent passes through splitter 23 and enters optics 17 of camera 18. As described above camera 18 digitizes the image for processing.

Figure 3:
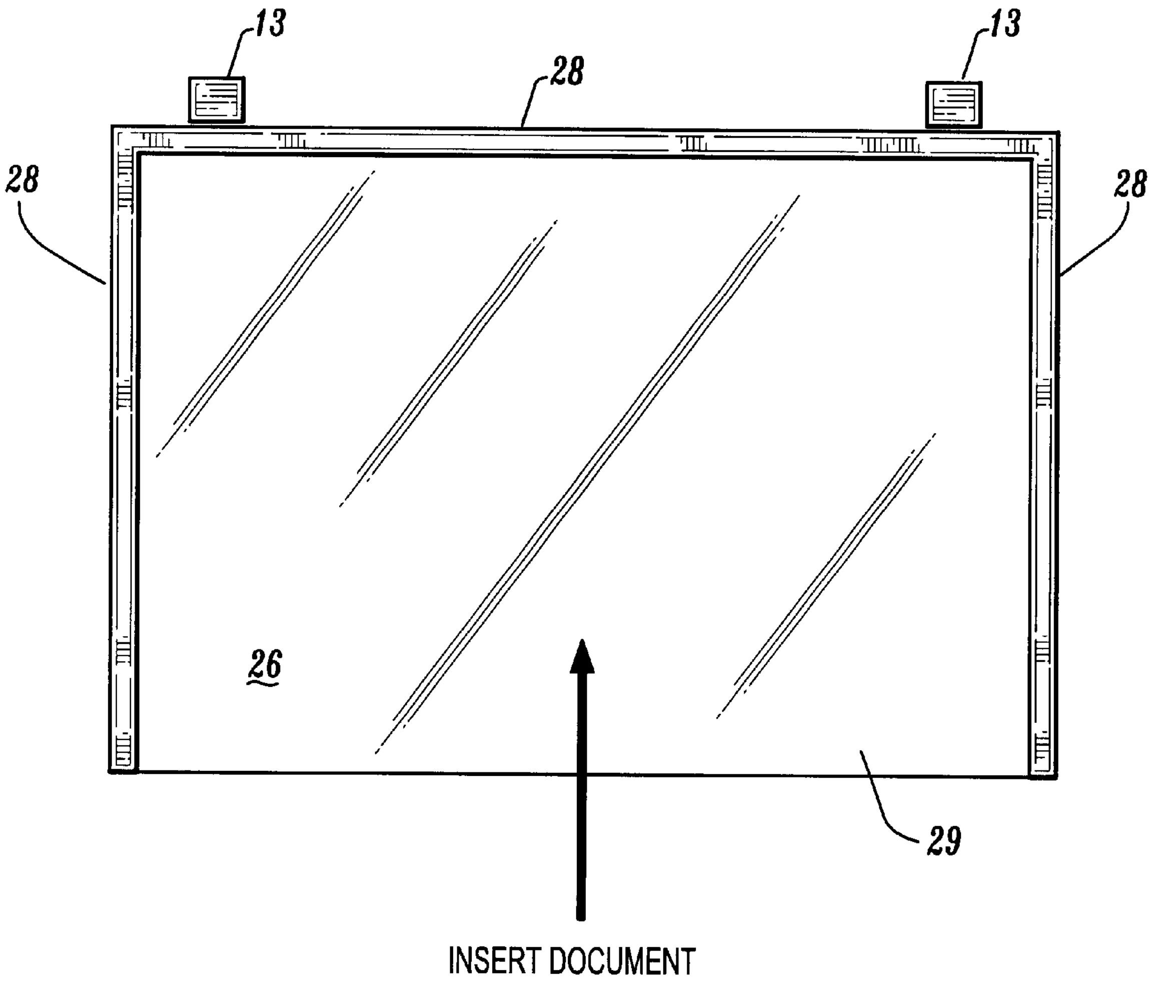
FIG. 3 shows a tray into which a document is inserted into the reader and triggers detection means to initiate reading and verification of the document.

In FIG. 3 is shown a tray 26 in document reader 10 into which a passport or other document 11 is inserted until it operates at least one of switches 13 to initiate the process reading and verifying passport or document 11. There is a side frame 28 and glass top 29 facing the camera 18 and light sources 12. Alternatively, switches 13 may be replaced by light sources and light sensors which are used in a manner well known in the art. Document 11 is inserted until it interrupts the beam of light passing between the sources and sensors. The output from sensors 13 initiates the process reading and verifying passport or document 11.

Figure 4A:
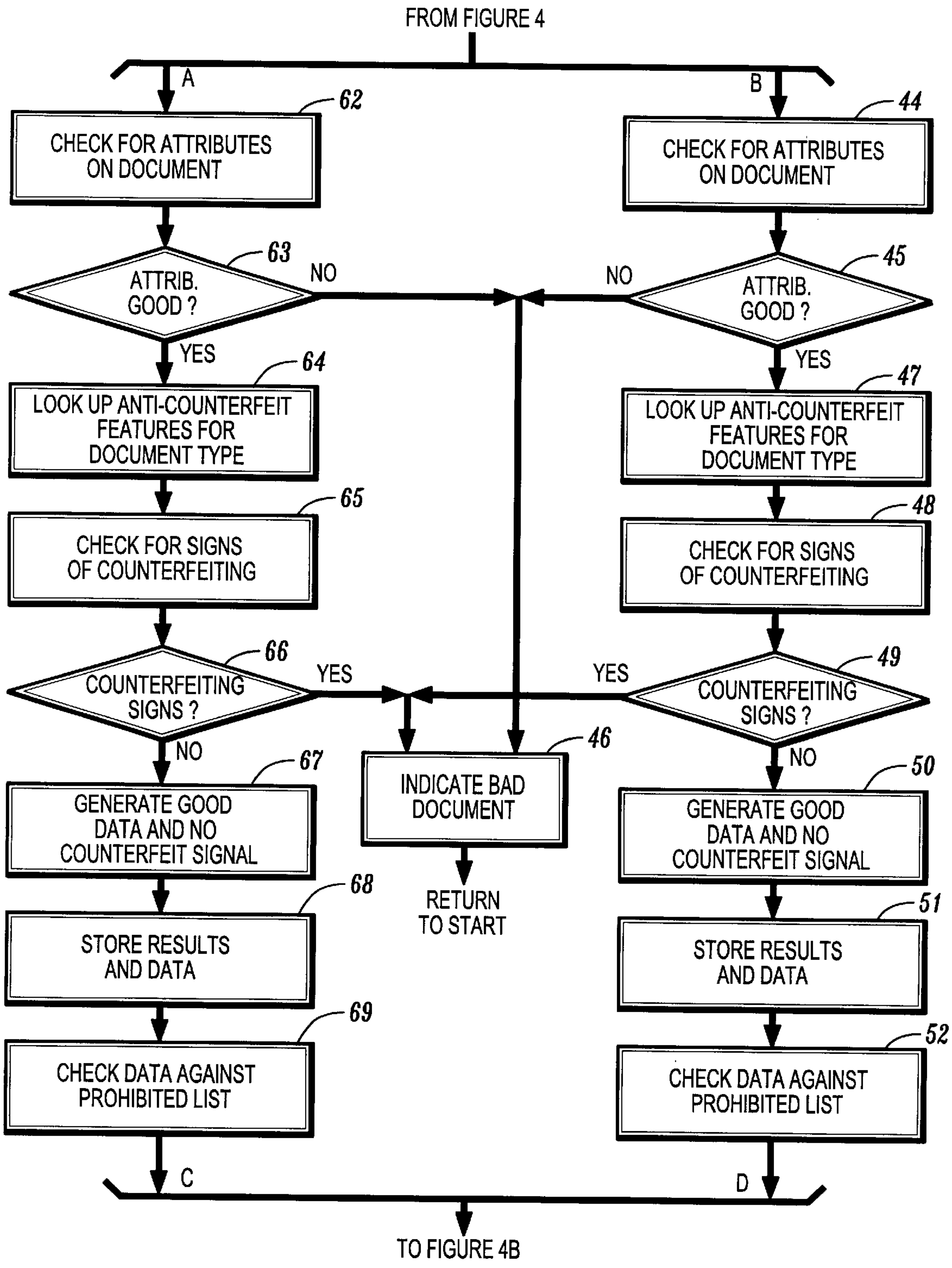
Figure 4B:
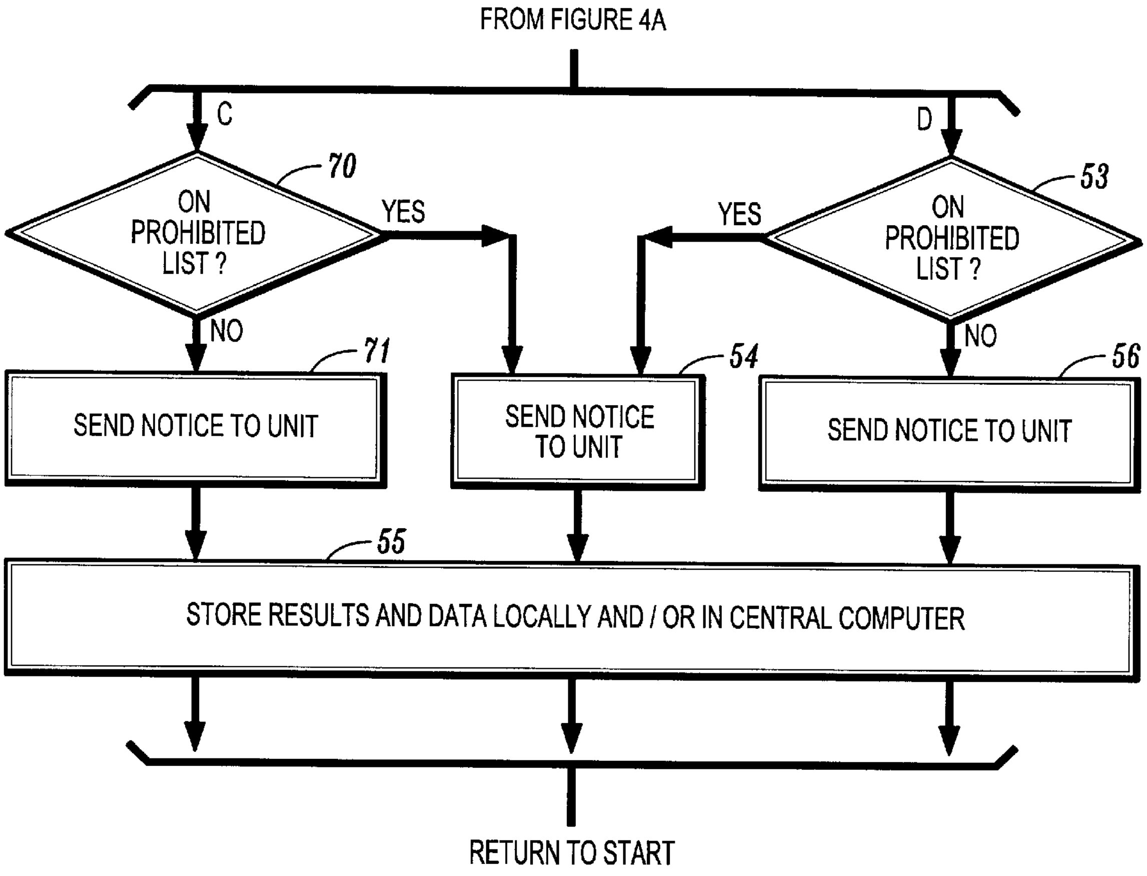
Figure 4C:
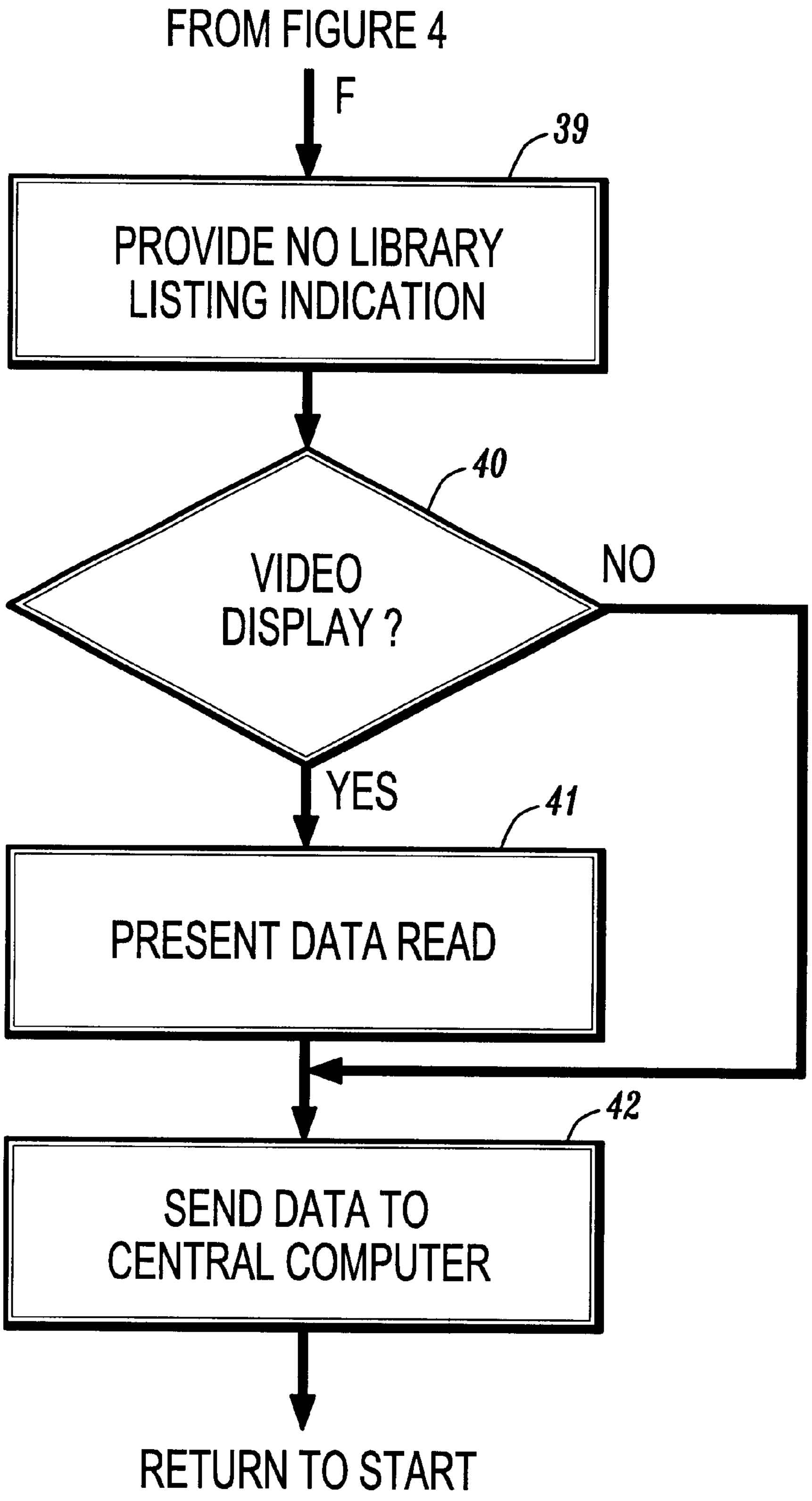

In FIGS. 4A through 4C is shown a flow chart of the document capture, processing and verification accomplished by the equipment and software in accordance with the teaching of the present invention.

When powered up reader/verifier 10 starts in an idle state wherein CPU 14 awaits a document to be inserted into slot 12. CPU 14 periodically checks the output of switches 13 to determine when a document 11 has been inserted into slot 12. This is shown as the decision step in block 30 which continuously cycles back to check for the presence of a document 11 in slot 12 when it has been determined that no document 11 is present in slot 12.

When the presence of a document is detected by CPU 14 sensing the operation of one of switches 13 the program progress to block 31 to Start Image Capture Block 31. Responsive to its program CPU 14 first operates the aforementioned balanced white light output from a fluorescent light source. At Capture Image block 32 CPU 14 energizes camera 18 and the light image reflected from document 11 passes through optics 17, is scanned by camera 18, digitized by A/D converter 19 and is stored in Memory 20.

The next step is at decision block 33 (All Images Captured?) where it is determined if all images have been captured and stored. Since only the first image has been stored at this point the program cycles back to block 32 to capture the next image. This cycling is repeated through the direct lighting IR, blue and UV light sources, and the indirect IR, blue and UV light sources and all the images produced thereby are stored in memory 20.

When all images have been captured (stored) the decision is made at block 33 to progress to block 34 (Analyze First Image For MRZ Data) to check for the presence of an MRZ data field with data in it on document 11. MRZ data is always located in fixed positions on documents that have MRZ data fields. CPU 14 checks the specific positions in the first stored image (indirect infrared light) for the MRZ data. The selected image portions are processed through optical character reader (OCR) software to "read" any alphanumeric data in the MRZ field.

By analyzing the information read in the expected position, at decision block 35 CPU 14 is able to determine if the document is a passport, or another type of document that includes an MRZ field, or it is not. Such MRZ information includes, but is not limited to, the name, birthday, sex, and place of birth of the person to whom the passport is issued; and the date of issuance and expiration of the passport, the issuing authority, issue run, and passport number.

Once CPU 14 has determined at block 35 that the document contains MRZ data the program progresses to Analyze MRZ Data block 36. From the MRZ data CPU 14 at block 37 determings the type of document. The program then progresses to block 38 where it checks to see if it has information (attributes) about the type of document stored in a library. This attribute information indicates what other information is stored on the document, and where it is stored.

If CPU 14 determines that the document type is not in the library it branches to NO to the steps shown in FIG. 4C. In FIG. 4C at block 39 CPU sends an indication to the operator of reader/verifier 10 at display 21 that the document type is not in the library. In this case an indication to the operator via two line display 21 that the document type is not in the library. If optional video display 24 is provided, as determined at block 40, then the data read from the document is placed on video display 24. If optional video 24 is not provided the program branches to block 42 which is described in the next sentence. Finally, at block 42 the data read from the document is sent to the central computer, if one is connected via network port 22, and the program returns to its initial Start state.

When the type document read is in the library, the program branches from block 38 at YES to block 43. At block 43 the various attributes about the identified document type are read out of memory for use by CPU 14 in analyzing document 12. The attribute information includes whether or not document 12 has a photograph, other identifiers such as fingerprints or eyeprint (in graphic or data format), and other information. CPU 14, under the control of its stored program, then looks for and reads the other information stored on the passport or other document for verification of the document.

Using the attribute information read out of memory 20, at block 44 the different stored, digitized images are searched and analyzed to read out data and graphics at their indicated locations on the document for verification.

At block 45 a decision is made as to whether or not document 11 is good based on the authentication test of its attributes. If it is determined that the document is not good, the program branches at NO to block 46 where an indication is given to the operator of reader/verifier 10 that document 11 has not been authenticated/verified. This indication is given via two line display 21 and optional video display 24.

If document 11 has been verified, the program branches at YES and progresses to block 47 to check for counterfeited or altered documents. Knowing the document type CPU 14 looks up in a stored library anti-counterfeiting features for the known document type. Using the anti-counterfeiting information read out of library document 11 is analyzed for evidence of counterfeiting or alterations. Such anti-counterfeiting features include, but are not limited to, use of special inks that appear differently under different light sources, are magnetic or have other physical properties; the document being made of special paper with embedded patterns or markings such as watermarks; holograms attached to the base passport material or which are embedded in the security laminate material; and invisible markings in the base passport material or the security laminates that appear under certain indirect color lighting, or under direct lighting; position of the special visible or invisible anti-counterfeiting features on the document and their physical size and position. These features are checked for in the plural stored images.

After all counterfeiting and alteration testing is complete the program progresses to decision block 49 where it provides outputs depending on what was found during the verification testing process. If it has been determined that the document is a complete counterfeit or has been altered, the program branches to block 46 where it provides an output to the operator of reader/verifier 10 that the document 11 being read and checked is a complete counterfeit or has been altered. This output is via display 21 and via optional video display 24 where more detail may be provided as to what uncovered in the testing/verification process. The operator takes appropriate actions to apprehend the bearer of the counterfeit/altered document. The program also returns to its Start state.

If no counterfeiting or alterations are detected, and the document 11 was determined to be good during the attribute testing, at block 50 CPU 14 provides an appropriate output via display 21 and via optional video display 24 where more detail may be provided as to what uncovered in the attribute, counterfeit, and alteration testing.

With all document verification testing completed and the results reported to the operator of the equipment, at block 51 the results are temporarily stored, and at the end of all testing and verification, at block 55 some or all of the verification testing results and document data are transferred via network port 22 to a central computer (not shown) for storage.

The final test that is performed is to check to see if the bearer of a verified document is on a prohibited entry or other list. Such other lists may include wanted for a crime, etcetera. This final test is done at block 52. The prohibited entry or other lists may be loaded into reader verifier 10, or may accessed at a central computer via network port 22. After comparison against the prohibited list(s) at block 53 CPU 14 determines if the bearer of document 11 is on a prohibited or other list. If the bearer of document 11 is not on any prohibited or other list the program progresses to block 56 where it provides an output to the operator of reader verifier 10. The output is via display 21 and/or via optional video display 24 where more detail may be provided.

The program then progresses to block 55 where some or all the above described verification testing results and document data are forwarded via network port 22 to the central computer (not shown) to be stored.

After all this done the program returns to its Start state awaiting a document 11 to inserted into reader verifier 10.

If it is determined that the bearer of document 11 is on a prohibited or other list, the program branches to block 54 and a different notice is provided to the operator of reader verifier 10. The output is via display 21 and/or via optional video display 24 where more detail may be provided as what list the document bearer is on. At block 55 some or all the above described verification testing results and document data are forwarded via network port 22 to the central computer (not shown) to be stored.

After all this done the program returns to its Start state awaiting a document 11 to inserted into reader verifier 10.

Returning to FIG. 4, in the event that Reader/Verifier 10 initially determines that document 11 does not contain MRZ data at block 35, the program branches instead to block 58 where it reads and analyzes all the digitized and stored images. The program searches the first stored image, read using indirect IR light, for alphanumeric text using a stored OCR program. When alphanumeric text is located the area searched is expanded until all the alphanumeric text is located and read. Since there may be more than one area on the document in which alphanumeric text is located, this search and read process is repeated until all alphanumeric text on document 11 is located and read.

Once all alphanumeric text has been read on non-MRZ document 11, the program and CPU 14 progress to block 59 to determine what type document 11 is. This is done primarily by locating the document identity in the read alphanumeric information. Alternatively, if the document identity cannot be found in the read alphanumeric text, the identity can often be determined by the locations and types of alphanumeric text and other information on document 11.

With the document type determined at block 59 the program progresses to block 60 where it checks to see if it has information (attributes) about the type of document stored in a library.

If CPU 14 determines that the document type is not in the library it branches to NO to the steps shown in FIG. 4C. In FIG. 4C at block 39 CPU sends an indication to the operator of reader/verifier 10 at two line display 21 that the document type is not in the library. In this case an LED (not shown) is lit that indicates that the document type is not in the library. If optional video display 24 is provided, as determined at block 40, then the data read from the document is placed on video display 24. If optional video 24 is not provided the program branches to block 42 which is described in the next sentence. Finally, at block 42 the data read from the document is sent to the central computer, if one is connected via network port 22, and the program returns to its initial Start state.

When the non-MRZ type document read is in the library, the program branches from block 60 at YES to block 61. At block 61 the various attributes about the identified document type are read out of memory for use by CPU 14 in analyzing document 11. The attribute information includes whether or not document 12 has a photograph, other identifiers such as fingerprints or eyeprint (in graphic or data format), and other information. CPU 14, under the control of its stored program, then looks for and reads the other information stored on the passport or other document for verification of the document.

Using the attribute information read out of memory 20, at block 62 the different stored, digitized images are searched and analyzed to read out data and graphics at their indicated locations on the document for verification.

At block 63 a decision is made as to whether or not document 11 is good based on the authentication test of its attributes. If it is determined that the document is not good, the program branches at NO to block 46 where an indication is given to the operator of reader/verifier 10 that document 11 has not been authenticated/verified. This indication is given via display 21 and optional video display 24.

If document 11 has been verified, the program branches at YES and progresses to block 64 to check for counterfeited or altered documents. Knowing the document type CPU 14 looks up in a stored library anti-counterfeiting features for the known document type. Using the anti-counterfeiting information read out of library document 11 is analyzed for evidence of counterfeiting or alterations. Such anti-counterfeiting features include, but are not limited to, use of special inks that appear differently under different light sources, are magnetic or have other physical properties; the document being made of special paper with embedded patterns or markings such as watermarks; holograms attached to the base passport material or which are embedded in the security laminate material; and invisible markings in the base passport material or the security laminates that appear under certain indirect color lighting, or under direct lighting; position of the special visible or invisible anti-counterfeiting features on the document and their physical size and position. These features are checked for in the plural stored images.

After all counterfeiting and alteration testing is complete the program progresses to decision block 66 where it provides outputs depending on what was found during the verification testing process. If it has been determined that the document is a counterfeit or has been altered, the program branches to block 46 where it provides an output to the operator of reader/verifier 10 that the document 11 being read and checked is a counterfeit or has been altered. This output is via display 21 and via optional video display 24 where more detail may be provided as to what uncovered in the testing/verification process. The operator takes appropriate actions to apprehend the bearer of the counterfeit/altered document. The program also returns to its Start state.

If no counterfeiting or alterations are detected, and the document 11 was determined to be good during the attribute testing, at block 67 CPU 14 provides an appropriate output via display 21 and via optional video display 24 where more detail may be provided as to what uncovered in the attribute, counterfeit, and alteration testing.

With all document verification testing completed and the results reported to the operator of the equipment, at block 68 the results are temporarily stored, and at the end of all testing and verification, at block 55 some or all of the verification testing results and document data are transferred via network port 22 to a central computer (not shown) for storage.

The final test that is performed is to check to see if the bearer of a verified document is on a prohibited entry or other list. Such other lists may include wanted for a crime, etcetera. This final test is done at block 69. The prohibited entry or other lists may be loaded into reader verifier 10, or may accessed at a central computer via network port 22. After comparison against the prohibited list(s) at block 70 CPU 14 determines if the bearer of document 11 is on a prohibited or other list. If the bearer of document 11 is not on any prohibited or other list the program progresses to block 71 where it provides an output to the operator of reader verifier 10. The output is via display 21 and/or via optional video display 24 where more detail may be provided.

The program then progresses to block 55 where some or all the above described verification testing results and document data are forwarded via network port 22 to the central computer (not shown) to be stored.

After all this done the program returns to its Start state awaiting a document 11 to inserted into reader verifier 10.

If it is determined that the bearer of document 11 is on a prohibited or other list, the program branches to block 54 and a different notice is provided to the operator of reader verifier 10. The output is via display 21 and/or via optional video display 24 where more detail may be provided as what list the document bearer is on. At block 55 some or all the above described verification testing results and document data are forwarded via network port 22 to the central computer (not shown) to be stored.

After all this done the program returns to its Start state awaiting a document 11 to inserted into reader verifier 10.

While what has been described hereinabove is the preferred embodiment of the invention, it should be understood by those skilled in the art that numerous changes may be made without departing from the scope of the invention. For example, the order of document reading and verifying steps may be changed. In the preferred embodiment of the invention described above all the multiple images are stored before processing starts. Alternatively, images may be taken and stored in a different order. Initially, only the first image taken using balanced white light may be analyzed for MRZ data. Depending on the results of the MRZ test, different ones (but not all) of the remaining images can be captured and analyzed. Or, testing for counterfeit documents can be accomplished before testing for various document attributes.

Also, different visible and invisible light sources may be added and utilized as new security materials and anti-counterfeiting measures are developed. Still further, as new types of information are added to documents the analysis program may be modified to read and analyze such new types of information. An example of such new type of information may be data giving spacing between facial features. Also, micro-miniature electronic devices may be embedded into documents, and these devices may be read and/or actuated to read and/or verifying the documents. Such micro-miniature electronic devices are already known and used in "smart cards".

What is claimed is:

1. Apparatus for verifying documents to determine if they are genuine, counterfeit, or if they have been altered, each document having a number of attributes, said apparatus including a plurality of different light sources that are sequentially energized to create multiple, different images of a document being verified, and said multiple, different images contain the attributes of a document being verified, and said apparatus comprising:

means for checking a first one of said multiple images of a document for a first type of information therein;

means responsive to said first type of information for determining the type of document that is being verified;

a first list of attributes for each of a plurality of different types of documents that may be verified using said apparatus;

means for analyzing said multiple, different images for said attributes means for comparing the attributes in said first list for the type of document that is being verified with attributes actually on said first document as contained in said multiple images to determine if said first document is genuine, counterfeit, or if it has been altered; and means for providing a first indication that said first document is genuine, counterfeit, or has been altered.

2. The apparatus in accordance with claim 1 wherein said means for analyzing comprises:

a first list of attributes for each of a plurality of different types of documents that may be verified using said apparatus; and means for comparing the attributes in said first list for the type of document that is being verified with attributes actually on said first document as contained in said multiple images.

3. The apparatus in accordance with claim 2 wherein said means for generating multiple, different images of a first document comprises means for sequentially energizing said plurality of different light sources.

4. The apparatus in accordance with claim 2 further comprising a second list of security features for each of said plurality of different types of documents that may be verified by said apparatus, said security features being used to determine if said first document is genuine, counterfeit or has been altered.

5. The apparatus in accordance with claim 4 further comprising means for comparing the security features in said second list for the type of document that is being verified with security features actually on said first document as contained in said multiple images.

6. The apparatus in accordance with claim 5 further comprising means for providing a second indication to an operator of said apparatus that said first document is counterfeit or has been altered.

7. The apparatus in accordance with claim 6 further comprising:

a third list of named parties who must be detained or investigated further; and means for comparing the named parties on said third list with the name on said first document.

8. The apparatus in accordance with claim 7 further comprising means for providing an indication to an operator of said apparatus that the party who carries said first document is on said third list.

9. The apparatus in accordance with claim 2 wherein said means for generating multiple, different images of said first document comprises a camera for creating an electronic image of said document when each of said plurality of different light sources is energized.

10. The apparatus in accordance with claim 9 wherein said means for generating multiple, different images of said first document further comprises means for digitizing said electronic image of said document output from said camera.

11. The apparatus in accordance with claim 2 comprising optical means located in a first path between said means for generating multiple, different images and said first document, said optical means reflecting light from said plurality of different light sources along said first path and onto said first document, and light reflected from said first document travels along said first path and through said optical to said means for generating multiple, different images of said first document.

12. The invention in accordance with claim 11 wherein ones of said plurality of different light sources generate light that is visible, and others ones of said plurality of different light sources generate light that is invisible.

13. The invention in accordance with claim 2 wherein ones of said plurality of different light sources generate light that is visible, and others ones of said plurality of different light sources generate light that is invisible.

14. The apparatus in accordance with claim 2 further comprising a second list of security features for each of said plurality of different types of documents that may be verified by said apparatus, said security features being used to determine if said first document is genuine, counterfeit or has been altered.

15. The apparatus in accordance with claim 14 further comprising means for comparing the security features in said second list for the type of document that is being verified with security features actually on said first document as contained in said multiple images.

16. The apparatus in accordance with claim 15 further comprising means for providing a second indication to an operator of said apparatus that said first document is genuine, counterfeit or has been altered.

17. The apparatus in accordance with claim 16 further comprising:

a third list of named parties who must be detained or investigated further; and means for comparing the named parties on said third list with the name on said first document.

18. The apparatus in accordance with claim 17 further comprising means for providing an indication to an operator of said apparatus that the party who carries said first document is on said third list.

19. A method for verifying documents to determine if they are genuine, counterfeit, or if they have been altered, each document having a number of attributes, and a plurality of different light sources are sequentially energized to create multiple, different images of a document being verified, and said multiple, different images contain the attributes of a document being verified, said method comprising the steps of:

checking a first one of said multiple images of a document that is being verified to determine what type of document it is;

comparing attributes stored in a first list of attributes for each of a plurality of different types of documents that may be verified with attributes actually on said first document as contained in said multiple images to determine if said first document is genuine, counterfeit, or if it has been altered; and providing a first indication that said first document is genuine, counterfeit, or has been altered.

20. The method in accordance with claim 19 wherein said step of analyzing said multiple images for said attributes to verify a document comprises the step of comparing attributes stored in a first list for the type of document that is being verified with attributes actually on said first document as contained in said multiple images.

21. The method in accordance with claim 20 wherein said step of analyzing said multiple images to verify a document further comprises the steps of:

comparing security features stored in a second list for the type of document that is being verified with security features actually on said first document as contained in said multiple images, said security features being used to determine if said first document is genuine, counterfeit or has been altered; and providing a second indication that said first document is genuine, counterfeit or has been altered.

22. The method in accordance with claim 21 further comprising the steps of:

comparing the persons name on said first document with names stored in a third list of named parties who must be detained or investigated further; and providing an indication to an operator of said verifier apparatus that the party who carries said document is on said third list.

23. The method in accordance with claim 22 wherein said step of generating multiple, different images of said first document comprises the step of illuminating said first document with certain ones of said different light sources along an optical path that is identical to the optical path that light travels when reflected from said first document.

* * * * *